(12) United States Patent
Li

(10) Patent No.: US 6,928,075 B2
(45) Date of Patent: Aug. 9, 2005

(54) METHOD AND APPARATUS FOR AGGREGATING MULTICAST INTERFACES

(75) Inventor: Yunzhou Li, Lowell, MA (US)

(73) Assignee: Nortel Networks Limited (CA)

( * ) Notice: Subject to any disclaimer, the term of this patent is extended or adjusted under 35 U.S.C. 154(b) by 993 days.

(21) Appl. No.: 09/732,041

(22) Filed: Dec. 7, 2000

(65) Prior Publication Data

US 2002/0071442 A1 Jun. 13, 2002

(51) Int. Cl.⁷ ..................... H04L 12/56; H04L 12/54
(52) U.S. Cl. ................................................ 370/390
(58) Field of Search ................... 370/432, 390, 370/312, 395.2, 395.3, 395.31, 400, 401, 357; 709/238, 249

(56) References Cited

PUBLICATIONS

S. Deering, "RFC 1112: Host Extensions for IP Multicasting", Networking Group, Request for Comments, 1–17, Aug. 1989.
J. Moy, "RFC 1585: MOSPF: Analysis and Experience", Network Working Group, Request for Comments, 1–13, Mar. 1994.
J. Moy, "RFC 1584: Multicast Extensions to OSPF", Network Working Group, Request for Comments, 1–102, Mar. 1994.
W. Fenner, "RFC 2236: Internet Group Management Protocol, Version 2", Network Working Group, Request for Comments, 24, Mar. 1997.

*Primary Examiner*—Chau Nguyen
*Assistant Examiner*—Blanche Wong
(74) *Attorney, Agent, or Firm*—Steubing McGuinness & Manaras LLP

(57) ABSTRACT

An apparatus and method for processing multicast traffic in a given multicast domain aggregates one or more multicast interfaces into an aggregation interface, each multicast interface linked to a multicast domain other than the given multicast domain via a domain interface, the aggregation interface linked to the given multicast domain via an inbound interface. The apparatus and method then receives at the aggregation interface one or more multicast domain group membership messages from one or more of the other multicast domains, forwards multicast traffic for a particular multicast group from the given multicast domain towards the one or more other multicast domains via the inbound interface, and determines whether one or more of the other multicast domains is interested in the particular multicast group. Last, the apparatus and method, for each other multicast domain determined to be interested in the particular multicast group, establishes the domain interface as the outbound interface for the forwarded multicast traffic.

91 Claims, 5 Drawing Sheets

METHOD AND APPARATUS FOR AGGREGATING MULTICAST INTERFACES

FIELD OF THE INVENTION

The invention generally relates to networks and, more particularly, the invention relates to multicast transmissions across a computer network.

BACKGROUND OF THE INVENTION

Multicasting is a well-know method of transmitting information to selected groups of users across a network, such as the Internet. For example, the transmission of an e-mail message to a group of users, each user being listed on a mailing list, uses multicasting principles. Video conferencing and teleconferencing also use multicasting principles and, accordingly, are often referred to as "multi-conferencing."

Due to the increased demand for uses utilizing multicasting principles, protocols such as the Internet Group Multicast Protocol ("IGMP") have been developed and refined to support multicasting over a Transmission Control Protocol/Internet Protocol ("TCP/IP") network, such as the Internet. The new protocols, such as IGMP, allow users to easily create and join multicasting session ("multicasts"). However, in some protocols, such as Multicast Extensions to Open Shortest Path First ("MOSPF") protocol, changes in, for example, the number of users in a multicast, or the creation of a new multicast, cause a network running these protocols to recalculate "route information" across the network. In other words, the changes cause a network running these protocols to recalculate the information the network uses to forward a multicast from a source to a user. In general, route information recalculations increase overhead costs, such as memory allocation and processor utilization. Moreover, route information recalculations limit the physical size of a network running these protocols.

SUMMARY OF THE INVENTION

In accordance with one aspect of the invention, an apparatus and method for processing multicast traffic in a given multicast domain aggregates one or more multicast interfaces into an aggregation interface, each multicast interface linked to a multicast domain other than the given multicast domain via a domain interface, the aggregation interface linked to the given multicast domain via an inbound interface. The apparatus and method then receives at the aggregation interface one or more multicast domain group membership messages from one or more of the other multicast domains, forwards multicast traffic for a particular multicast group from the given multicast domain towards the one or more other multicast domains via the inbound interface, and determines whether one or more of the other multicast domains is interested in the particular multicast group. Last, the apparatus and method, for each other multicast domain determined to be interested in the particular multicast group, establishes the domain interface as the outbound interface for the forwarded multicast traffic.

In accordance with another aspect of the invention, an apparatus and method for processing multicast traffic in a network aggregates one or more multicast interfaces into an aggregation interface, the aggregation interface linked to a given multicast domain via an inbound interface, each multicast interface linked to a multicast domain other than the given multicast domain via a domain interface. The apparatus and method then forwards one or more multicast domain group membership messages to the aggregation interface from one or more of the other multicast domains, receives at the aggregation interface the one or more forwarded multicast domain group membership messages, and forwards multicast traffic for a particular multicast group from the given multicast domain towards the one or more other multicast domains via the inbound interface. Next, the apparatus and method determines whether one or more of the other multicast domains is interested in the particular multicast group. Last, the apparatus and method, for each other multicast domain determined to be interested in the particular multicast group, establishes the domain interface as the outbound interface for the forwarded multicast traffic.

In a further embodiment of both aspects of the invention, the apparatus and method forwards a multicast group membership message from the aggregation interface to the given multicast domain.

In alternate embodiments of both aspects of the invention, the inbound interface may be a link-state protocol interface. In particular, the link-state protocol may be Multicast Extensions to Open Shortest Path First protocol. In addition, the multicast group membership message may be a Group Membership Link-State Advertisement message.

In further alternate embodiments of the invention, at least one of the domain interfaces may be an Internet Group Management Protocol interface. Also, at least one of the multicast domain group membership messages may be an Internet Group Management Protocol Membership Report message, or at least one of the multicast domain group membership messages may be an Internet Group Management Protocol Leave Group message. In addition, at least one Internet Group Management Protocol interface may run Open Shortest Path First protocol, Multicast Extensions to Open Shortest Path First protocol, or Routing Information Protocol.

In still further alternate embodiments of the invention, the aggregation interface may be a circuit-less interface.

In yet still further alternate embodiments of the invention, the given multicast domain may run a link-state protocol. In particular, the link-state protocol may be Multicast Extensions to Open Shortest Path First protocol. In addition, the other multicast domains may be downstream of the given multicast domain.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF THE INVENTION

In accordance with one embodiment of the invention, multicast interfaces linked to a multicast domain running a protocol that requires the multicast domain to recalculate route information over the network for various changes in, for example, multicast membership, are aggregated into an aggregation interface. The aggregation interface limits the need for the multicast domain to recalculate route information over the network for the various changes in, for example, multicast membership. The aggregation interface may be a circuit-less interface.

Figure 1:
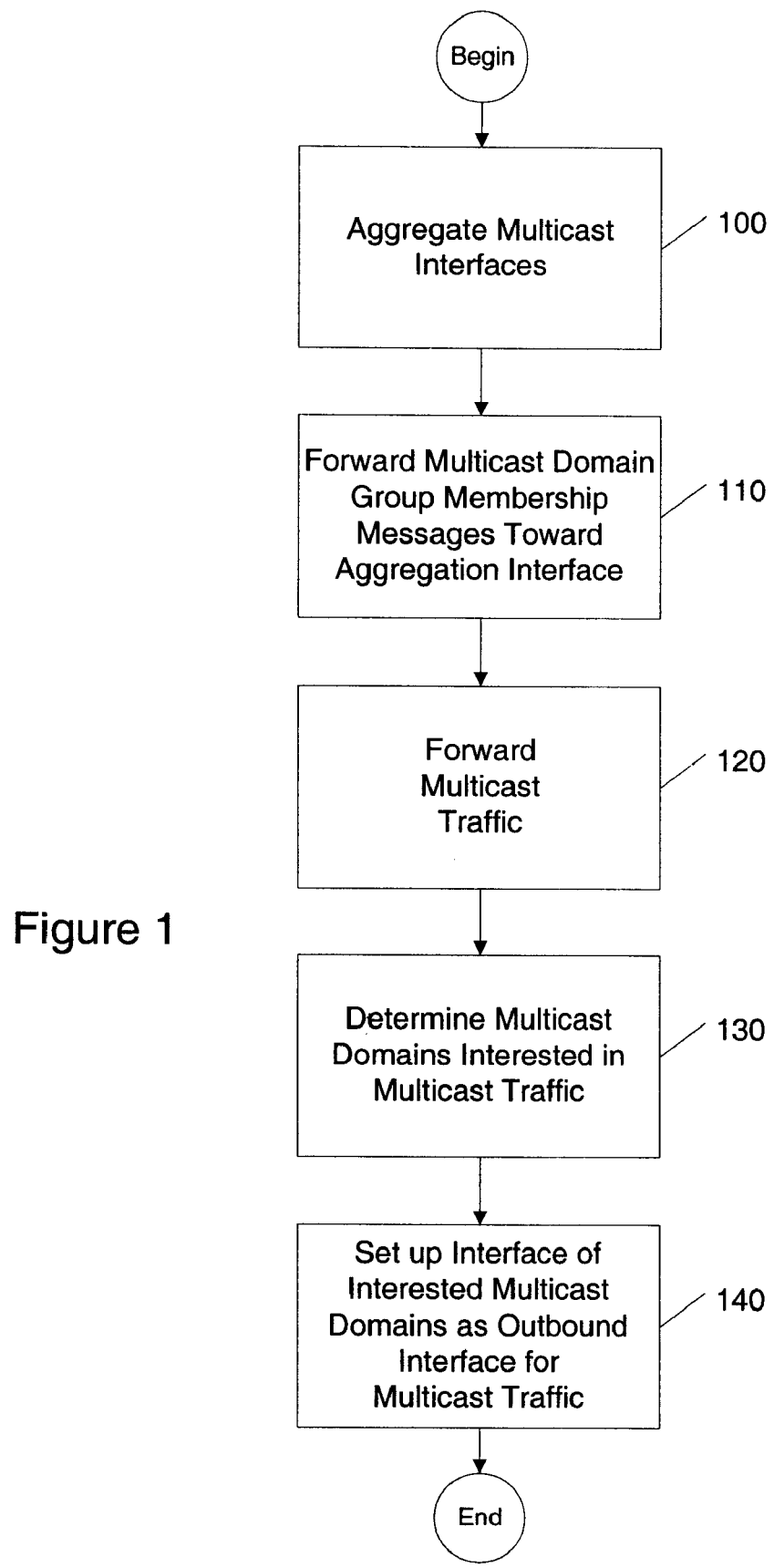
FIG. 1 shows an exemplary process for implementing one embodiment of the invention in a particular multicast domain.

FIG. 1 shows an exemplary process for implementing one embodiment of the invention in a particular multicast domain. The process begins at step 100, in which one or more multicast interfaces are aggregated at, or near, the edge of a particular multicast domain. A multicast interface links one multicast domain to, for example, another multicast domain. The "area" at which the multicast interfaces are aggregated is referred to as an aggregation interface. The aggregation interface may be implemented in computer hardware, computer software, or computer firmware. For example, the aggregation interface may be a router. Or, the aggregation interface may be a circuit-less interface, in other words, a circuit-less address.

The phrase "multicast domain" is used for ease of reference. It refers to all forms of multicast environments, including local area networks, wide area networks, Internet Protocol networks, sub-networks, autonomous systems, areas, and sub-areas.

The process continues at step 110, in which one or more of the multicast domains linked to the particular multicast domain forwards one or more multicast domain group membership messages towards the aggregation interface via the respective multicast interface. In general, multicast domain group membership messages inform the aggregation interface of, among other things, the source of a multicast and the destination of a multicast. For example, the multicast domain group membership message may be an Internet Group Management Protocol ("IGMP") Membership Report message or an IGMP Leave Group message. A multicast interface running IGMP is referred to as an IGMP interface.

Next, at step 120, the particular multicast domain forwards multicast traffic, via an interface, towards the one or more multicast domains linked to the particular multicast domain. From the perspective of the one or more multicast domains linked to the particular multicast domain, the interface carries, among other things, "inbound" multicast traffic. Accordingly, the interface between the particular multicast domain and the one or more multicast domains linked to the particular multicast domain is referred to as an "inbound" interface.

Then, at step 130, each of the one or more multicast domains linked to the particular multicast domain is consulted to determine which of the one or more multicast domains linked to the particular multicast domain are "interested" in the multicast traffic forwarded from the particular multicast domain. In general, multicast traffic is addressed to a specific multicast group, the multicast group containing members. Thus, a multicast domain linked to the particular multicast domain is interested in the multicast traffic when the multicast domain has members who are part of the specific multicast group addressed in the multicast traffic.

Last, at step 140, for each multicast domain interested in the forwarded multicast traffic, the interface linking the multicast domain to the aggregation interface is set up as the "outbound" interface, from the perspective of the aggregation interface, for the forwarded multicast traffic. In other words, the aggregation interface is not set up as an "outbound" interface for the forwarded multicast traffic. Instead, the multicast traffic is forwarded to each multicast domain interested in the multicast traffic via the multicast interface linking the respective multicast domain to the aggregation interface.

In a further embodiment of the invention, the aggregation interface forwards a multicast group membership message to the particular multicast domain. In general, like the multicast domain group membership message, the multicast group membership message informs the particular multicast domain of, among other things, the source of a multicast and the destination of a multicast. For example, the multicast domain group membership message may be a Group Membership Link-State Advertisement ("Group Membership LSA") message.

Typically, a Group Membership LSA message is used in a link-state protocol multicast domain. In a link-state protocol, such as Multicast Extensions to Open Shortest Path First ("MOSPF") protocol, the state of an interface is a description of both the interface (e.g., the interface's address) and the interface's relationships (e.g., the type of network the interface is connected to, the routers connected to that network, etc.). In general, a multicast domain running a link-state protocol must, as discussed above, recalculate route information over the network for various changes in, for example, multicast membership. A multicast interface running a link-state protocol is referred to as a link-state protocol interface.

In an alternate embodiment of the invention, multicast traffic forwarded from the particular multicast domain to the one or more multicast domains linked to the particular multicast domain flows, logically, from the inbound interface, through the aggregation interface, to the outbound interface.

In other alternate embodiments of the invention, the particular multicast domain runs a link-state protocol, e.g., MOSPF protocol. Also, the inbound interface may be a link-state interface, e.g., a MOSPF interface. In still other alternate embodiments of the invention, at least one of the multicast interfaces linking the aggregation interface to one of the other multicast domains is an IGMP interface. An IGMP interface may run various protocols, e.g., MOSPF protocol, Open Shortest Path First protocol, or Routing Information Protocol ("RIP").

Figure 2:
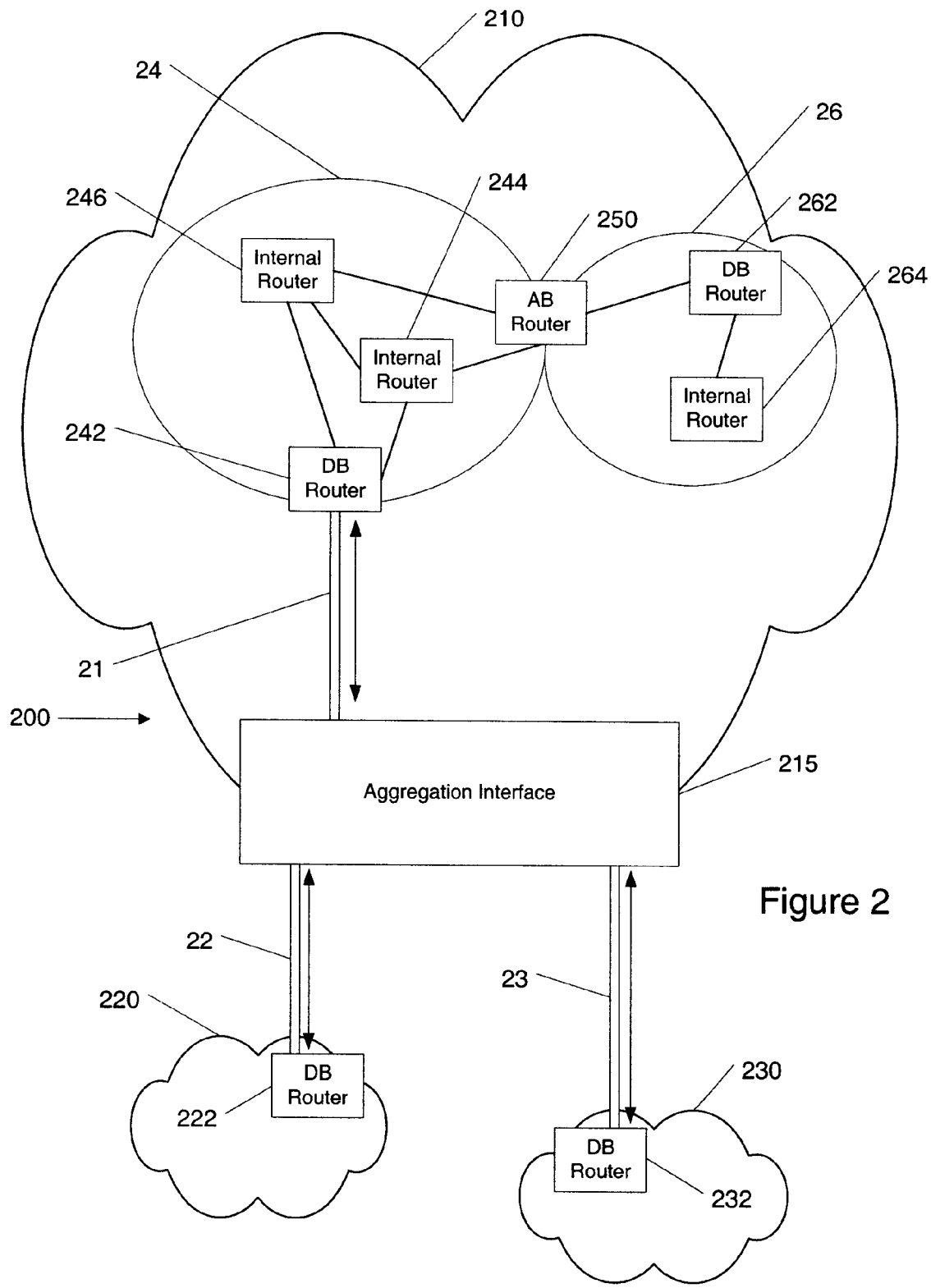
FIG. 2 schematically shows an exemplary network, in which various embodiments of the invention may be implemented.

FIG. 2 schematically shows an exemplary network, network 200, in which various embodiments of the invention may be implemented. Network 200 includes multicast domain 210, multicast domain 220, and multicast domain 230.

Multicast domain 210 includes area 24 and area 26. Area 24 includes two internal routers, internal router 244 and internal router 246, and one domain border router ("DB router"), DB router 242. An internal router has all of its interfaces in one area. A domain border router acts as a "gateway" between routing protocols, e.g., between MOSPF protocol and RIP. Area 26 includes one internal router, internal router 264, and one DB router, DB router 262. A router, area border router ("AB router") 250, straddles both area 24 and area 26. An area border router has interfaces in more than one area.

Multicast domain 220 has one router, DB router 222. Similarly, multicast domain 230 has one router, DB router 232.

In addition, network 200 includes aggregation interface 215. Aggregation interface 215 is linked, via interface 22, to DB router 222 in multicast domain 220. Similarly, aggregation interface 215 in linked, via interface 23, to DB router 232 in multicast domain 230. In addition, aggregation interface 215 is linked, via interface 21, to DB router 242 in multicast domain 210.

Figure 3A:
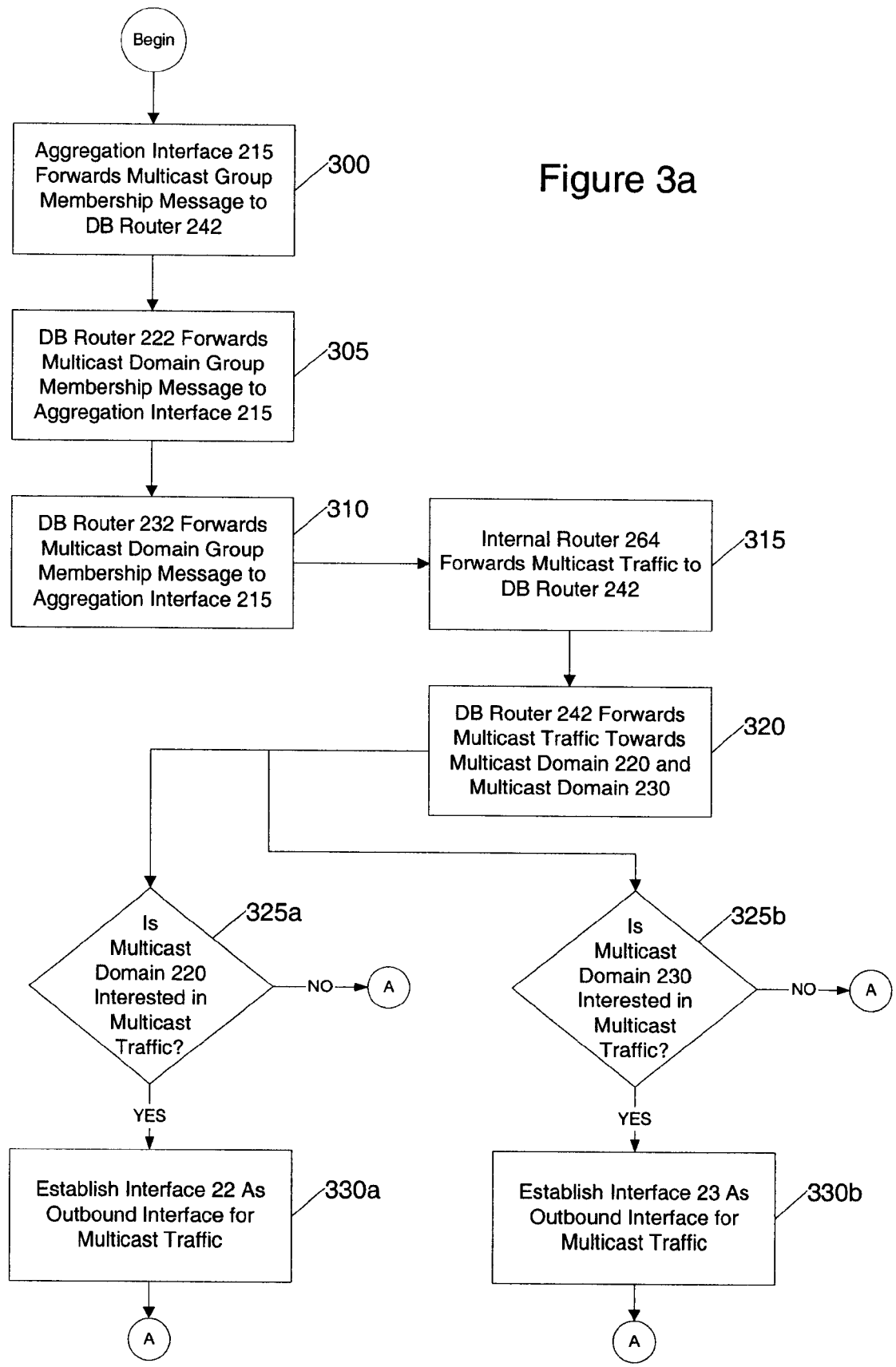
FIGS. 3a and 3b show an exemplary process for implementing one embodiment of the invention in the exemplary network shown in FIG. 2.
Figure 3B:
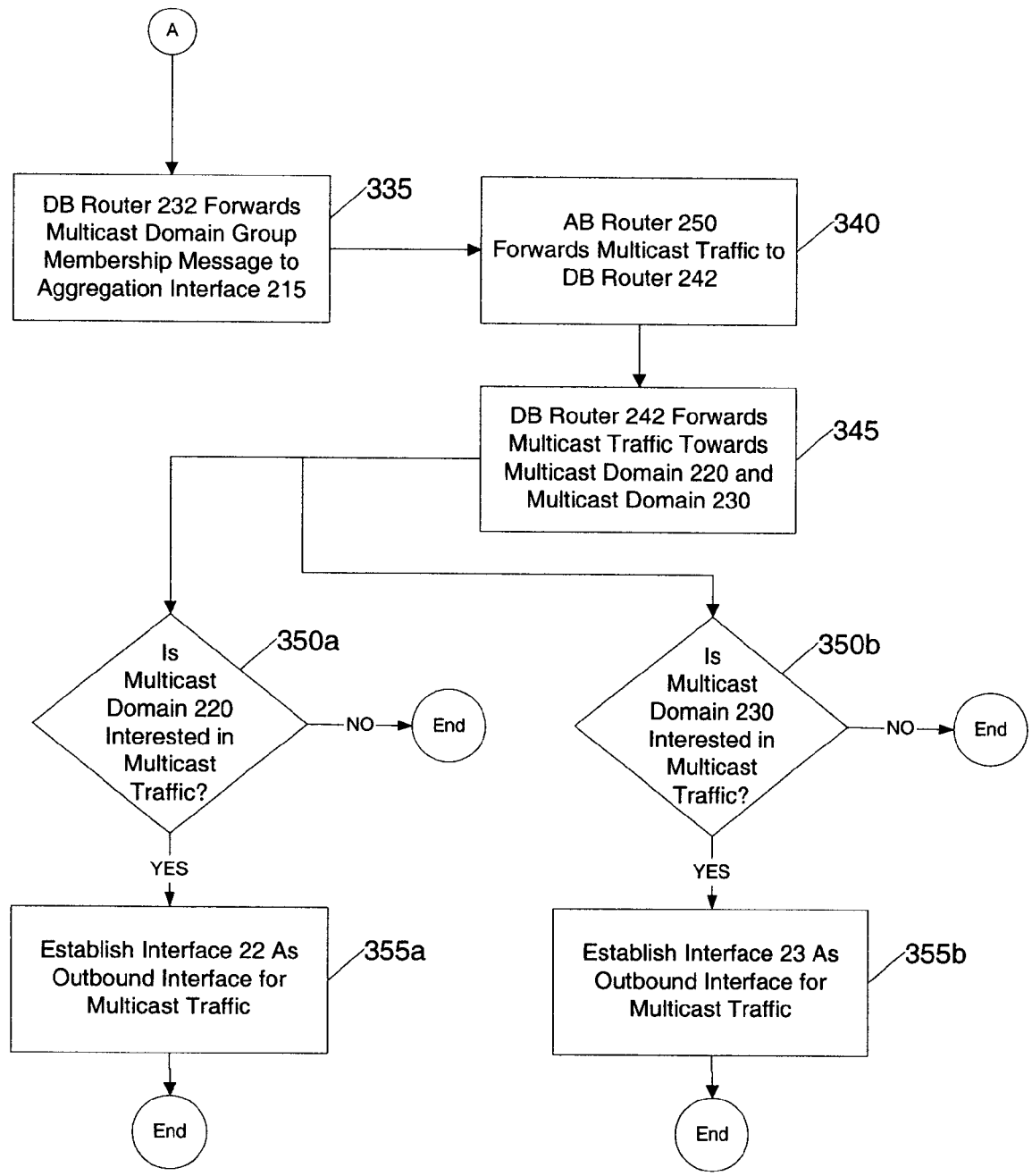

FIGS. 3a and 3b show an exemplary process for implementing one embodiment of the invention in network 200. The process begins at step 300, in which aggregation interface 215 forwards, via interface 21, a multicast group membership message to DB router 242 in multicast domain 210. For example, aggregation interface 215 may forward a Group Membership LSA message to DB router 242. In turn, DB router 242 would "flood" the message through each of its interfaces. In this embodiment, DB router 242 has two interfaces, one to internal router 246 and one to internal router 244. Internal router 246 would then "flood" the message through each of its interfaces, etc. This process ensures that every router in area 24 and, via AB router 250, every router in area 26, is informed of aggregation interface 215. Upon receipt of the Group Membership LSA, each router recalculates route information using, for example, Dijkstra's algorithm, to find the shortest path between the router and the aggregation interface.

The process continues at step 305, in which DB router 222 in multicast domain 220 forwards a multicast domain group membership message to aggregation interface 215. For example, DB router 222 may forward an IGMP Membership Report message to aggregation interface 215 informing aggregation interface 215 that DB router 222 is interested in multicast 226.20.20.1. At step 310, DB router 232 in multicast domain 230 forwards a multicast domain group membership message to aggregation interface 215. For example, DB router 232 may forward an IGMP Membership Report message to aggregation interface 215 informing aggregation interface 215 that DB router 232 is interested in multicast 226.20.30.1.

Then, at step 315, internal router 264 in area 26 of multicast domain 210 forwards multicast traffic, via the shortest path, to DB router 242 in area 24 of multicast domain 210. The multicast traffic includes multicast 226.20.20.1. At step 320, DB router 242 forwards the multicast traffic, via interface 21, towards multicast domain 220 and multicast domain 230. Next, at step 325a, multicast domain 220 is consulted to determine whether multicast domain 220 is interested in the multicast traffic. If yes, then at step 330a, interface 22 is established as an outbound interface. At step 325b, multicast domain 230 is consulted to determine whether multicast domain 230 is interested in the multicast traffic. If yes, then at step 330b, interface 23 is established as an outbound interface.

In the example given above, multicast domain 220 is interested in multicast 226.20.20.1. The multicast traffic forwarded from DB router 242 towards aggregation interface 215 includes multicast 226.20.20.1. Thus, in this example, interface 22 is established as the outbound interface for multicast 226.20.20.1.

The process continues at step 335, in which DB router 232 of multicast domain 230 forwards a multicast domain group membership message to aggregation interface 215. For example, DB router 232 may forward an IGMP Membership Report message to aggregation interface 215 informing aggregation interface 215 that DB router 232 is interested in multicast 226.20.10.1. Then, at step 340, AB router 250 forwards multicast traffic, via the shortest path, to DB router 242 in area 24 of multicast domain 210. The multicast traffic includes multicast 226.20.30.1 and multicast 226.20.10.1.

At step 345, DB router 242 forwards the multicast traffic, via interface 21, towards multicast domain 220 and multicast domain 230. Next, at step 350a, multicast domain 220 is consulted to determines whether multicast domain 220 is interested in the multicast traffic. If yes, then at step 355a, interface 22 is established as an outbound interface. At step 350b, multicast domain 230 is consulted to determine whether multicast domain 230 is interested in the multicast traffic. If yes, then at step 355b, interface 23 is established as an outbound interface.

In the example given above, multicast domain 230 is interested in multicast 226.20.10.1 and multicast 226.20.30.1. The multicast traffic forwarded from DB router 242 towards aggregation interface 215 includes multicast 226.20.10.1 and multicast 226.20.30.1. Thus, in this example, interface 23 is established as the outbound interface for multicast 226.20.10.1 and for multicast 226.20.30.1.

Figure 4:
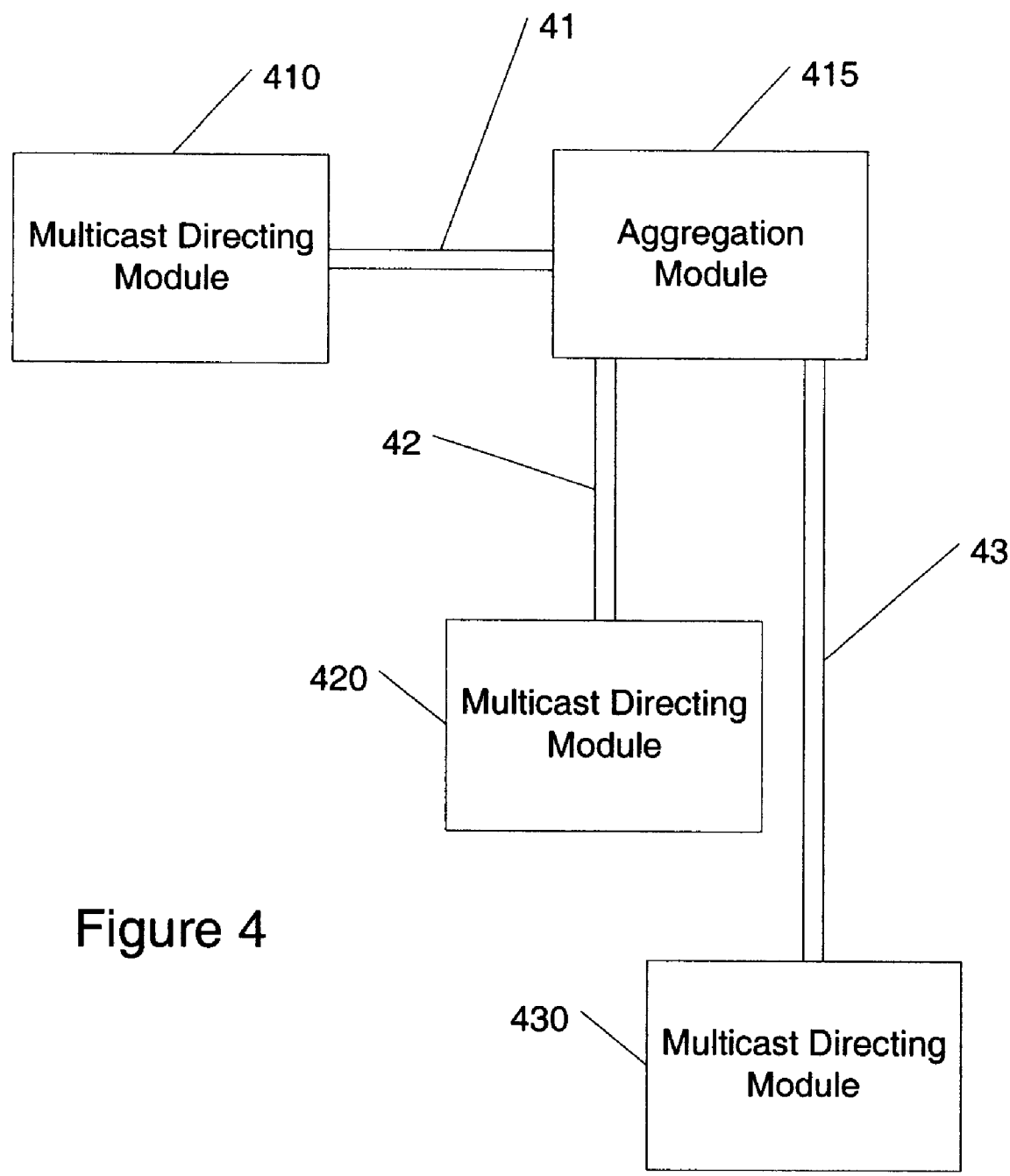
FIG. 4 is a block diagram of an exemplary apparatus for implementing various embodiments of the invention in the exemplary network shown in FIG. 2.

FIG. 4 is a block diagram of an exemplary apparatus for implementing various embodiments of the invention in network 200. The apparatus includes multicast directing module 410 at the edge of, for example, multicast domain 210, and aggregation module 415 at, or near, the edge of, for example, multicast domain 210. In this exemplary embodiment, multicast directing module 410 receives and floods multicast group membership messages from aggregation module 415, as well as forwards multicast traffic toward multicast directing module 420 and multicast directing module 430. Multicast directing module 410 is linked to aggregation module 415 via interface 41.

Aggregation module 415 is linked to multicast directing module 420 via interface 42. Aggregation module 415 is also linked to multicast directing module 430 via interface 43. Multicast directing module 420 is at the edge of, for example, multicast domain 220. Multicast directing module 430 is at the edge of, for example, multicast domain 230. Aggregation module 415 forwards multicast group membership messages to multicast directing module 410, receives multicast domain group membership messages from multicast directing module 420 and multicast directing module 430. Multicast directing module 410 determines whether multicast directing module 420 and multicast directing module 430 are interested in multicast traffic forwarded from multicast directing module 410. In an alternate embodiment, aggregation module 415 determines whether multicast directing module 420 and multicast directing module 430 are interested in multicast traffic forwarded from multicast directing module 410.

Multicast directing module 420 and multicast directing module 430 forward, respectively, multicast domain group membership messages to aggregation module 415. In addition, multicast directing module 420 and multicast directing module 430 forward multicast traffic received from, for example, multicast directing module 410 to their respective multicast domains.

The various embodiments of the invention may be implemented in any conventional computer programming language. For example, the various embodiments may be implemented in a procedural programming language (for example, "C") or an object-oriented programming language (for example, "C++" or JAVA). The various embodiments of the invention may also be implemented as preprogrammed hardware elements (for example, application specific integrated circuits or digital processors), or other related components.

The various embodiments of the invention may be also implemented as a computer program product for use with a computer system. Such implementation may include a series of computer instructions fixed either on a tangible medium, such as a computer readable media (for example, a diskette, CD-ROM, ROM, or fixed disk), or transmittable to a computer system via a modem or other interface device, such as a communications adapter connected to a network over a medium. The medium may be either a tangible medium (for example, optical or analog communications lines) or a medium implemented with wireless techniques (for example, microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (for example, shrink wrapped software), pre-loaded with a computer system (for example, on system ROM or fixed disk), or distributed from a server or electronic bulletin board over the network (for example, the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. A method for processing multicast traffic in a given multicast domain, the method comprising: aggregating one or more multicast interfaces into an aggregation interface, each multicast interface linked to a multicast domain other than the given multicast domain via a domain interface, the aggregation interface linked to the given multicast domain via an inbound interface; receiving at the aggregation interface one or more multicast domain group membership messages from one or more of the other multicast domains; forwarding multicast traffic for a particular multicast group from the given multicast domain towards one or more of the other multicast domains via the inbound interface; determining whether one or more of the other multicast domains is interested in the particular multicast group; and for each other multicast domain determined to be interested in the particular multicast group, establishing the domain interface as an outbound interface for the forwarded multicast traffic.

2. The method according to claim 1, further comprising: forwarding a multicast group membership message from the aggregation interface to the given multicast domain.

3. The method according to claim 2 wherein the inbound interface is a link-state protocol interface.

4. The method according to claim 3 wherein the link-state protocol is Multicast Extensions to Open Shortest Path First protocol.

5. The method according to claim 2 wherein the inbound interface is a link-state protocol interface.

6. The method according to claim 5 wherein the link-state protocol interface is Multicast Extensions to Open Shortest Path First protocol.

7. The method according to claim 3 or claim 5 wherein the multicast group membership message is a Group Membership Link-State Advertisement message.

8. The method according to claim 2 wherein at least one of the domain interfaces is an Internet Group Management Protocol interface.

9. The method according to claim 8 wherein at least one of the multicast domain group membership messages is an Internet Group Management Protocol Membership Report message.

10. The method according to claim 8 wherein at least one of the multicast domain group membership messages is an Internet Group Management Protocol Leave Group message.

11. The method according to claim 8 wherein the at least one Internet Group Management Protocol interface runs S, wherein S is Open Shortest Path First protocol, Multicast Extensions to Open Shortest Path First protocol, or Routing Information Protocol.

12. The method according to claim 1 wherein the aggregation interface is a circuit-less interface.

13. The method according to claim 1 wherein the given multicast domain runs a link-state protocol.

14. The method according to claim 13 wherein the link-state protocol is Multicast Extensions to Open Shortest Path First protocol.

15. A method for processing multicast traffic in a network, the method comprising: aggregating one or more multicast interfaces into an aggregation interface, the aggregation interface linked to a given multicast domain via an inbound interface, each multicast interface linked to a multicast domain other than the given multicast domain via a domain interface; forwarding one or more multicast domain group membership messages to the aggregation interface from one or more of the other multicast domains; receiving at the aggregation interface the one or more forwarded multicast domain group membership messages; forwarding multicast traffic for a particular multicast group from the given multicast domain towards the one or more other multicast domains via the inbound interface; determining whether one or more of the other multicast domains is interested in the particular multicast group; and for each other multicast domain determined to be interested in the particular multicast group, establishing the domain interface as an outbound interface for the forwarded multicast traffic.

16. The method according to claim 15, further comprising: forwarding a multicast group membership message from the aggregation interface to the given multicast domain.

17. The method according to claim 16 wherein the inbound interface is a link-state protocol interface.

18. The method according to claim 17 wherein the link-state protocol interface is Multicast Extensions to Open Shortest Path First protocol.

19. The method according to claim 16 wherein the inbound interface is a link-state protocol interface.

20. The method according to claim 19 wherein the link-state protocol interface is Multicast Extensions to Open Shortest Path First protocol.

21. The method according to claim 17 or claim 19 wherein the multicast group membership message is a Group Membership Link-State Advertisement message.

22. The method according to claim 16 wherein at least one of the domain interfaces is an Internet Group Management Protocol interface.

23. The method according to claim 22 wherein at least one of the multicast domain group membership messages is an Internet Group Management Protocol Membership Report message.

24. The method according to claim 22 wherein at least one of the multicast domain group membership messages is an Internet Group Management Protocol Leave Group message.

25. The method according to claim 22 wherein the at least one Internet Group Management Protocol interface runs S, wherein S is Open Shortest Path First protocol, Multicast Extensions to Open Shortest Path First protocol, or Routing Information Protocol.

26. The method according to claim 15 wherein the aggregation interface is a circuit-less interface.

27. The method according to claim 15 wherein the other multicast domains are downstream of the given multicast domain.

28. The method according to claim 15 wherein the given multicast domain runs a link-state protocol.

29. The method according to claim 28 wherein the link-state protocol is Multicast Extensions to Open Shortest Path First protocol.

30. An apparatus for processing multicast traffic in a given multicast domain, the apparatus comprising: an aggregation module for aggregating one or more multicast interfaces into an aggregation interface, each multicast interface linked to a multicast domain other than the given multicast domain via a domain interface, the aggregation interface linked to the given multicast domain via an inbound interface; a receiver for receiving at the aggregation interface one or more multicast domain group membership messages from one or more of the other multicast domains; a traffic forwarder for forwarding multicast traffic for a particular multicast group from the given multicast domain towards the one or more other multicast domains via the inbound interface; a determination module for determining whether one or more of the other multicast domains is interested in the particular multicast group; and for each other multicast domain determined to be interested in the particular multicast group, an interface module for establishing the domain interface as an outbound interface for the forwarded multicast traffic.

31. The apparatus according to claim 30, further comprising: a message forwarder for forwarding a multicast group membership message from the aggregation interface to the given multicast domain.

32. The apparatus according to claim 31 wherein the inbound interface is a link-state protocol interface.

33. The apparatus according to claim 32 wherein the link-state protocol interface is Multicast Extensions to Open Shortest Path First protocol.

34. The apparatus according to claim 31 wherein the inbound interface is a link-state protocol interface.

35. The apparatus according to claim 34 wherein the link-state protocol interface is Multicast Extensions to Open Shortest Path First protocol.

36. The apparatus according to claim 32 or claim 34 wherein the multicast group membership message is a Group Membership Link-State Advertisement message.

37. The apparatus according to claim 31 wherein at least one of the domain interfaces is an Internet Group Management Protocol interface.

38. The apparatus according to claim 37 wherein at least one of the multicast domain group membership messages is an Internet Group Management Protocol Membership Report message.

39. The apparatus according to claim 37 wherein at least one of the multicast domain group membership messages is an Internet Group Management Protocol Leave Group message.

40. The apparatus according to claim 37 wherein the at least one Internet Group Management Protocol interface runs S, wherein S is Open Shortest Path First protocol, Multicast Extensions to Open Shortest Path First protocol, or Routing Information Protocol.

41. The apparatus according to claim 30 wherein the aggregation interface is a circuit-less interface.

42. The apparatus according to claim 30 wherein the given multicast domain runs a link-state protocol.

43. The apparatus according to claim 42 wherein the link-state protocol is Multicast Extensions to Open Shortest Path First protocol.

44. An apparatus for processing multicast traffic in a network, the apparatus comprising: an aggregation module for aggregating one or more multicast interfaces into an aggregation interface, the aggregation interface linked to a given multicast domain via an inbound interface, each multicast interface linked to a multicast domain other than the given multicast domain via a domain interface; a message forwarder for forwarding one or more multicast domain group membership messages to the aggregation interface from one or more of the other multicast domains; a receiver for receiving at the aggregation interface the one or more forwarded multicast domain group membership messages; a traffic forwarder for forwarding multicast traffic for a particular multicast group from the given multicast domain towards the one or more other multicast domains via the inbound interface; a determination module for determining whether one or more of the other multicast domains is interested in the particular multicast group; and for each other multicast domain determined to be interested in the particular multicast group, an interface module for establishing the domain interface as an outbound interface for the forwarded multicast traffic.

45. The apparatus according to claim 44, further comprising: forwarding a multicast group membership message from the aggregation interface to the given multicast domain.

46. The apparatus according to claim 45 wherein the inbound interface is a link state protocol interface.

47. The apparatus according to claim 46 wherein the link-state protocol interface is Multicast Extensions to Open Shortest Path First protocol.

48. The apparatus according to claim 45 wherein the inbound interface is a link state protocol interface.

49. The apparatus according to claim 48 wherein the link-state protocol interface is Multicast Extensions to Open Shortest Path First protocol.

50. The apparatus according to claim 46 or claim 48 wherein the multicast group membership message is a Group Membership Link-State Advertisement message.

51. The apparatus according to claim 45 wherein at least one of the domain interfaces is an Internet Group Management Protocol interface.

52. The apparatus according to claim 51 wherein at least one of the multicast domain group membership messages is an Internet Group Management Protocol Membership Report message.

53. The apparatus according to claim 51 wherein at least one of the multicast domain group membership messages is an Internet Group Management Protocol Leave Group message.

54. The apparatus according to claim 51 wherein the at least one Internet Group Management Protocol interface runs S, wherein S is Open Shortest Path First protocol, Multicast Extensions to Open Shortest Path First protocol, or Routing Information Protocol.

55. The apparatus according to claim 44 wherein the aggregation interface is a circuit-less interface.

56. The apparatus according to claim 44 wherein the other multicast domains are downstream of the given multicast domain.

57. The apparatus according to claim 44 wherein the given multicast domain runs a link-state protocol.

58. The apparatus according to claim 57 wherein the link-state protocol is Multicast Extensions to Open Shortest Path First protocol.

59. A computer program product for processing multicast traffic in a given multicast domain, the computer program product comprising a computer usable medium having a computer readable program code thereon, the computer program code comprising: program code for aggregating one or more multicast interfaces into an aggregation interface, each multicast interface linked to a multicast domain other than the given multicast domain via a domain interface, the aggregation interface linked to the given multicast domain via an inbound interface; program code for receiving at the aggregation interface one or more multicast domain group membership messages from one or more of the other multicast domains; program code for forwarding multicast traffic for a particular multicast group from the given multicast domain towards the one or more other multicast domains via the inbound interface; program code for determining whether one or more of the other multicast domains is interested in the particular multicast group; and for each other multicast domain determined to be interested in the particular multicast group, program code for establishing the domain interface as an outbound interface for the forwarded multicast traffic.

60. The computer program product according to claim 59, further comprising: program code for forwarding a multicast group membership message from the aggregation interface to the given multicast domain.

61. The computer program product according to claim 60 wherein the inbound interface is a link-state protocol interface.

62. The computer program product according to claim 61 wherein the link-state protocol interface is Multicast Extensions to Open Shortest Path First protocol.

63. The computer program product according to claim 60 wherein the inbound interface is a link-state protocol interface.

64. The computer program product according to claim 63 wherein the link-state protocol interface is Multicast Extensions to Open Shortest Path First protocol.

65. The computer program product according to claim 61 or claim 63 wherein the multicast group membership message is a Group Membership Link-State Advertisement message.

66. The computer program product according to claim 60 wherein at least one of the domain interfaces is an Internet Group Management Protocol interface.

67. The computer program product according to claim 66 wherein at least one of the multicast domain group membership messages is an Internet Group Management Protocol Membership Report message.

68. The computer program product according to claim 66 wherein at least one of the multicast domain group membership messages is an Internet Group Management Protocol Leave Group message.

69. The computer program product according to claim 66 wherein the at least one Internet Group Management Protocol interface runs S, wherein S is Open Shortest Path First protocol, Multicast Extensions to Open Shortest Path First protocol, or Routing Information Protocol.

70. The computer program product according to claim 59 wherein the aggregation interface is a circuit-less interface.

71. The computer program product according to claim 59 wherein the given multicast domain runs a link-state protocol.

72. The computer program product according to claim 71 wherein the link-state protocol is Multicast Extensions to Open Shortest Path First protocol.

73. A computer program product for processing multicast traffic in a network, the computer program product comprising a computer usable medium having a computer readable program code thereon, the computer program code comprising: program code for aggregating one or more multicast interfaces into an aggregation interface, the aggregation interface linked to a given multicast domain via an inbound interface, each multicast interface linked to a multicast domain other than the given multicast domain via a domain interface; program code for forwarding one or more multicast domain group membership messages to the aggregation interface from one or more of the other multicast domains; program code for receiving at the aggregation interface the one or more forwarded multicast domain group membership messages; program code for forwarding multicast traffic for a particular multicast group from the given multicast domain towards the one or more other multicast domains via the inbound interface; program code for determining whether one or more of the other multicast domains is interested in the particular multicast group; and for each other multicast domain determined to be interested in the particular multicast group, program code for establishing the domain interface as an outbound interface for the forwarded multicast traffic.

74. The computer program product according to claim 73, further comprising: program code for forwarding a multicast group membership message from the aggregation interface to the given multicast domain.

75. The computer program product according to claim 74 wherein the inbound interface is a link-state protocol interface.

76. The computer program product according to claim 75 wherein the link-state protocol interface is Multicast Extensions to Open Shortest Path First protocol.

77. The computer program product according to claim 74 wherein the inbound interface is a link-state protocol interface.

78. The computer program product according to claim 77 wherein the link-state protocol interface is Multicast Extensions to Open Shortest Path First protocol.

79. The computer program product according to claim 75 or claim 77 wherein the multicast group membership message is a Group Membership Link-State Advertisement message.

80. The computer program product according to claim 74 wherein at least one of the domain interfaces is an Internet Group Management Protocol interface.

81. The computer program product according to claim 80 wherein at least one of the multicast domain group membership messages is an Internet Group Management Protocol Membership Report message.

82. The computer program product according to claim 80 wherein at least one of the multicast domain group membership messages is an Internet Group Management Protocol Leave Group message.

83. The computer program product according to claim 80 wherein the at least one Internet Group Management Protocol interface runs S, wherein S is Open Shortest Path First protocol, Multicast Extensions to Open Shortest Path First protocol, or Routing Information Protocol.

84. The computer program product according to claim 73 wherein the aggregation interface is a circuit-less interface.

85. The computer program product according to claim 73 wherein the other multicast domains are downstream of the given multicast domain.

86. The computer program product according to claim 73 wherein the given multicast domain runs a link-state protocol.

87. The computer program product according to claim 86 wherein the link-state protocol is Multicast Extensions to Open Shortest Path First protocol.

88. An apparatus for processing multicast traffic in a given multicast domain, the apparatus comprising: means for aggregating one or more multicast interfaces into an aggregation interface, each multicast interface linked to a multicast domain other than the given multicast domain via a domain interface, the aggregation interface linked to the given multicast domain via an inbound interface; means for receiving at the aggregation interface one or more multicast domain group membership messages from one or more of the other multicast domains; means for forwarding multicast traffic for a particular multicast group from the given multicast domain towards the one or more other multicast domains via the inbound interface; means for determining whether one or more of the other multicast domains is interested in the particular multicast group; and for each other multicast domain determined to be interested in the particular multicast group, means for establishing the domain interface as an outbound interface for the forwarded multicast traffic.

89. The apparatus according to claim 88, further comprising: means for forwarding a multicast group membership message from the aggregation interface to the given multicast domain.

90. An apparatus for processing multicast traffic in a network, the apparatus comprising: means for aggregating one or more multicast interfaces into an aggregation interface, the aggregation interface linked to a given multicast domain via an inbound interface, each multicast interface linked to a multicast domain other than the given multicast domain via a domain interface; means for forwarding one or more multicast domain group membership messages to the aggregation interface from one or more of the other multicast domains; means for receiving at the aggregation interface the one or more forwarded multicast domain group membership messages; means for forwarding multicast traffic for a particular multicast group from the given multicast domain towards the one or more other multicast domains via the inbound interface; means for determining whether one or more of the other multicast domains is interested in the particular multicast group; and for each other multicast domain determined to be interested in the particular multicast group, means for establishing the domain interface as an outbound interface for the forwarded multicast traffic.

91. The apparatus according to claim 90, further comprising: means for forwarding a multicast group membership message from the aggregation interface to the given multicast domain.

\* \* \* \* \*